E. C. MILLER.
MACHINE FOR FORMING AND WRAPPING CONFECTIONS.
APPLICATION FILED APR. 12, 1915.
1,182,293.
Patented May 9, 1916.
14 SHEETS—SHEET 1.
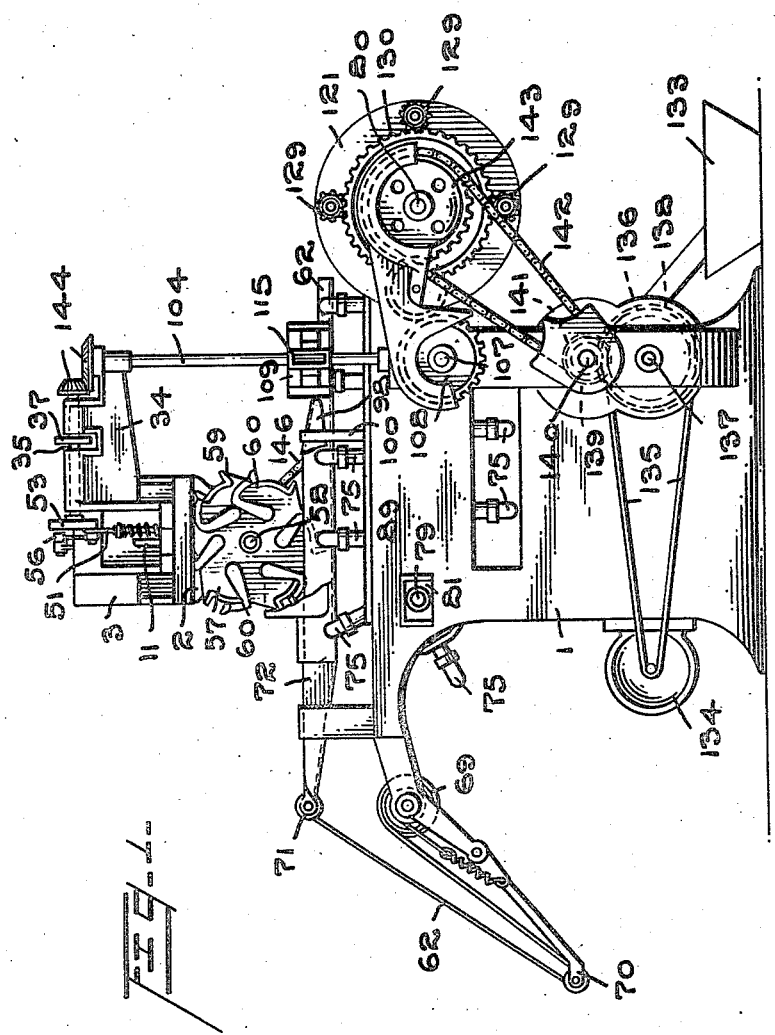

E. C. MILLER.
MACHINE FOR FORMING AND WRAPPING CONFECTIONS.
APPLICATION FILED APR. 12, 1915.
1,182,293.
Patented May 9, 1916.
14 SHEETS—SHEET 2.
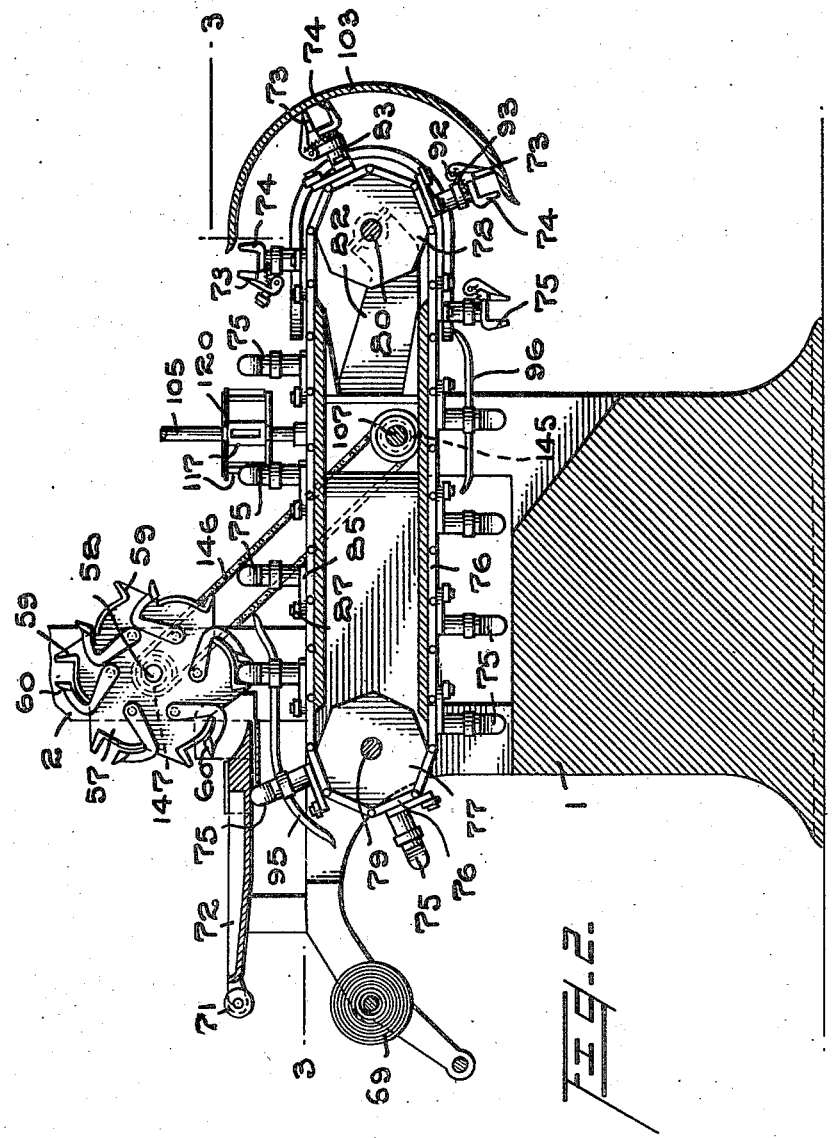
Witnesses
L. P. Mayer
C. R. Ziegler.
Inventor
Esech C. Miller,
By Joshua R. H. Potts.
Attorney

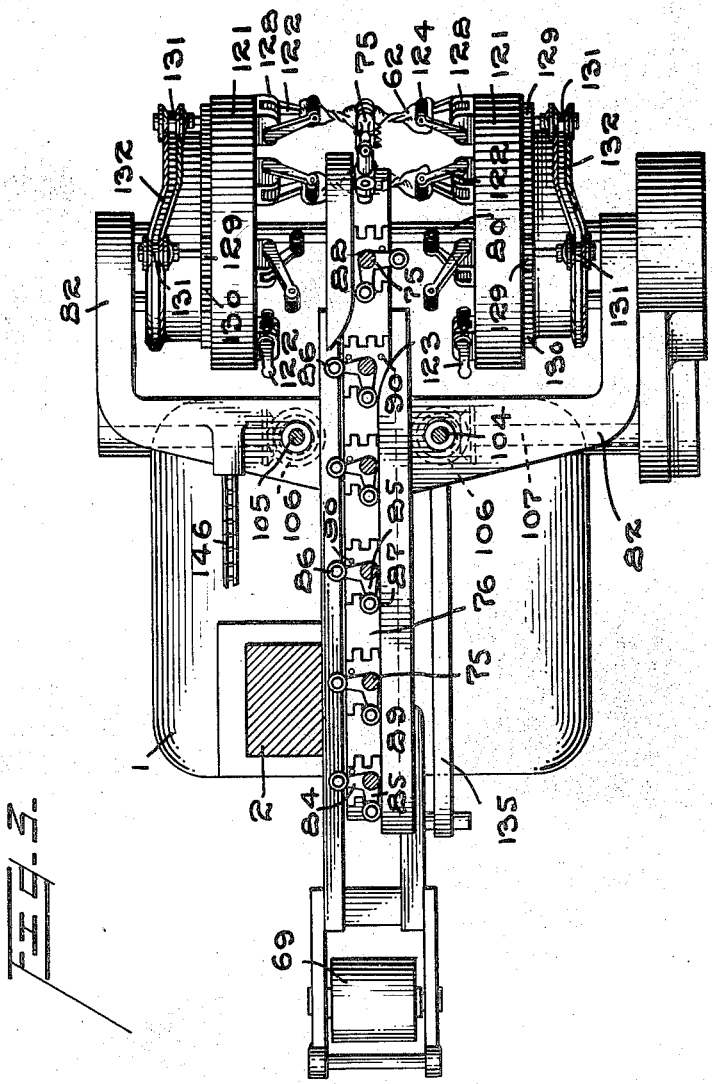

E. C. MILLER.
MACHINE FOR FORMING AND WRAPPING CONFECTIONS.
APPLICATION FILED APR. 12, 1915.
1,182,293.
Patented May 9, 1916.
14 SHEETS—SHEET 4.
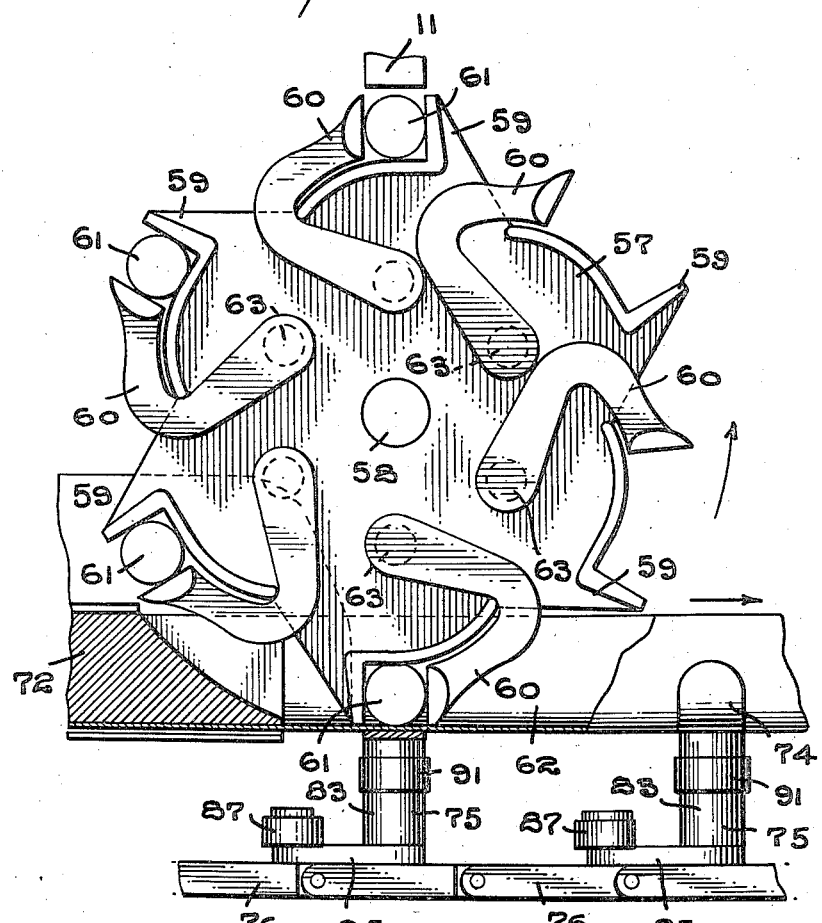
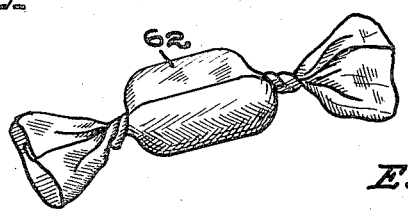

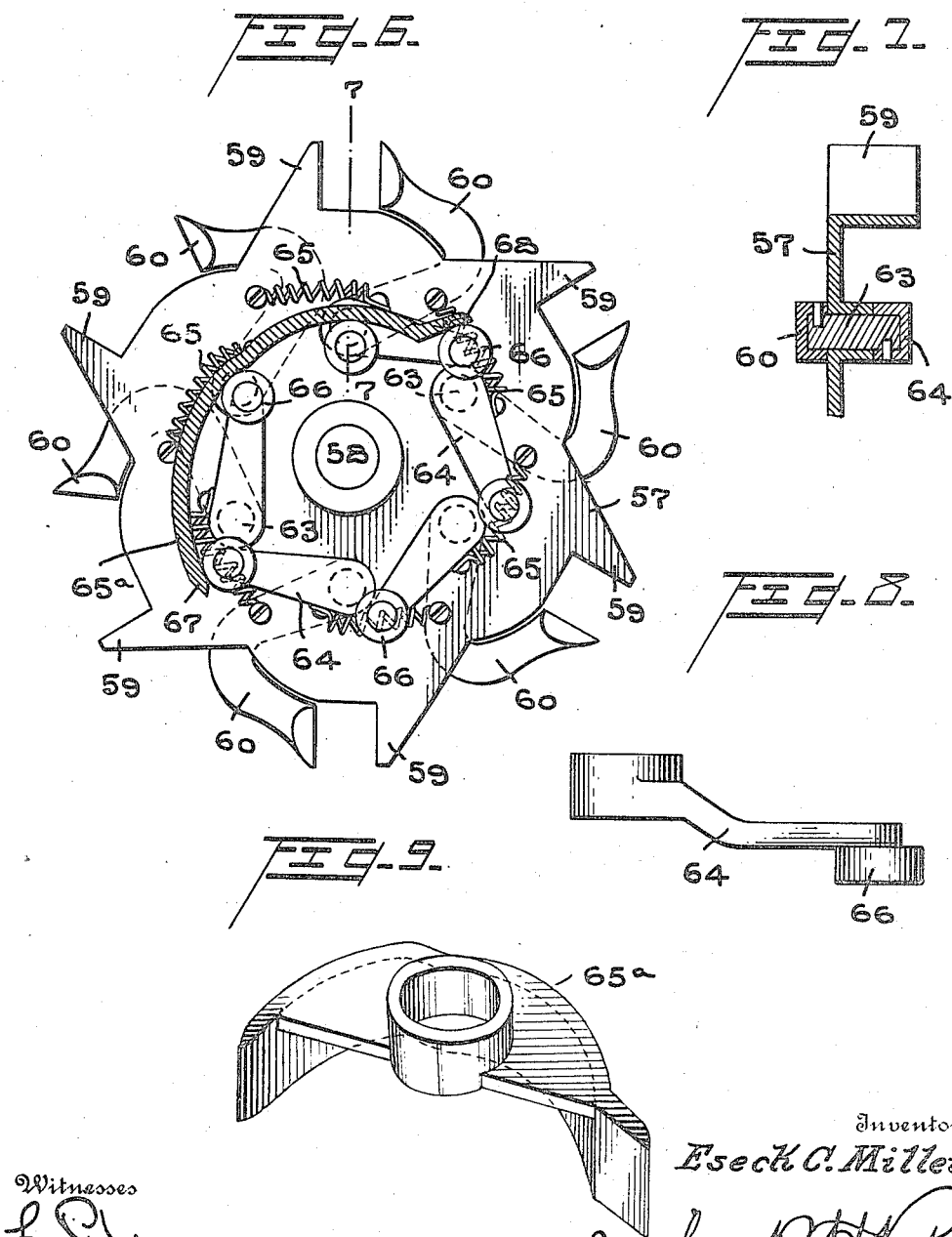

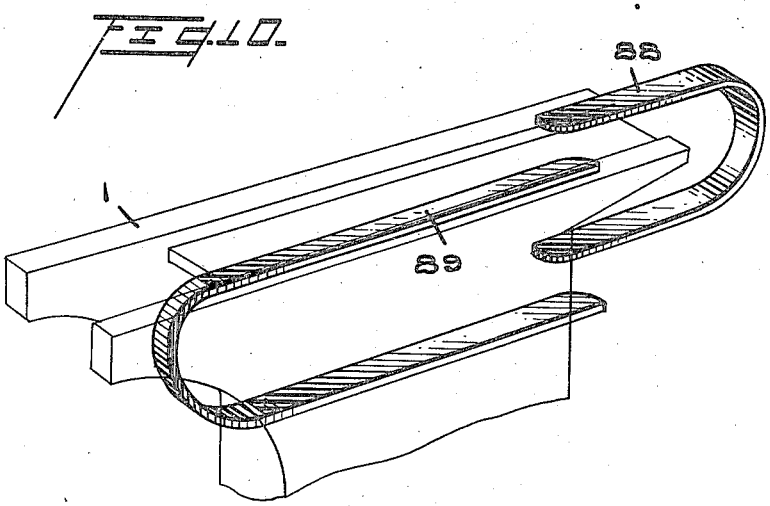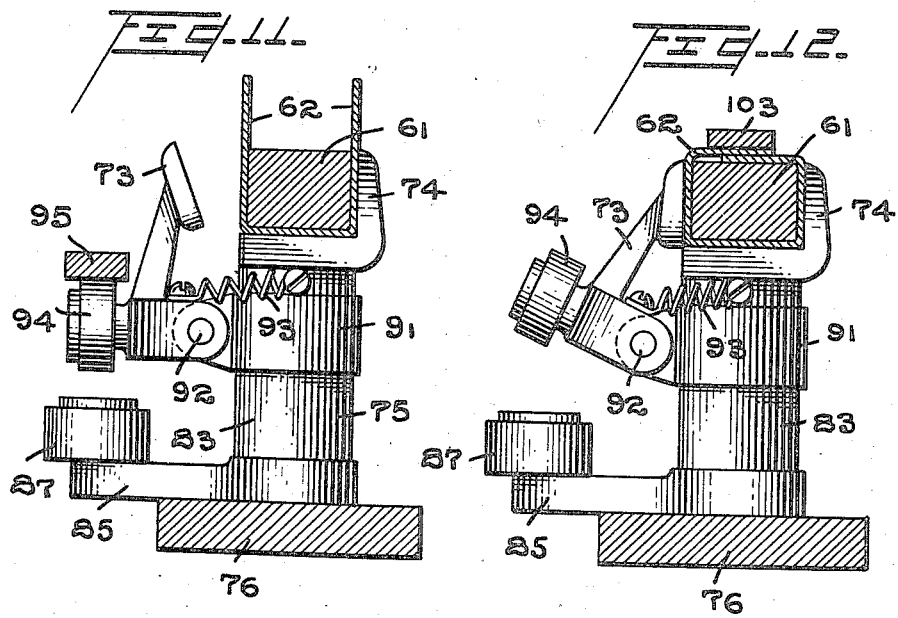

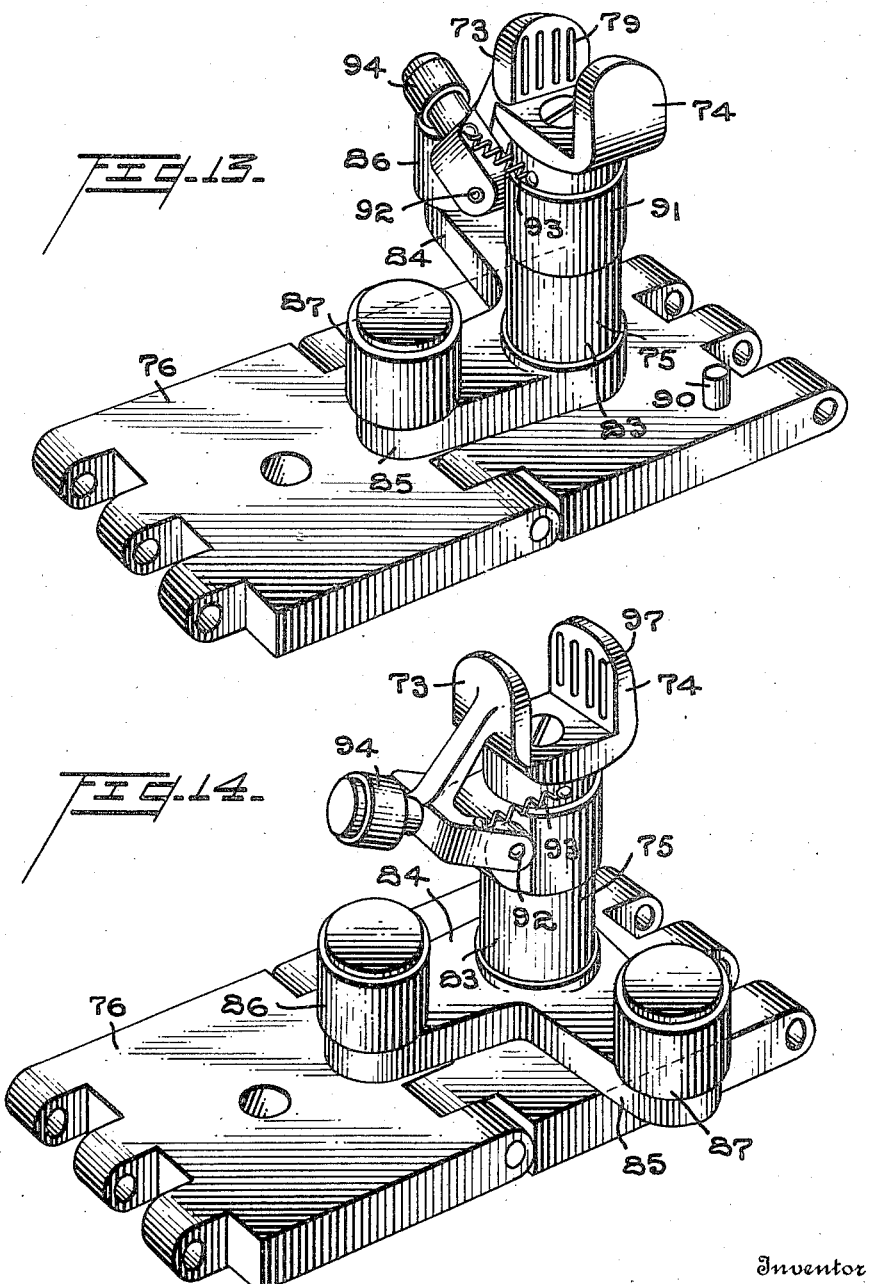

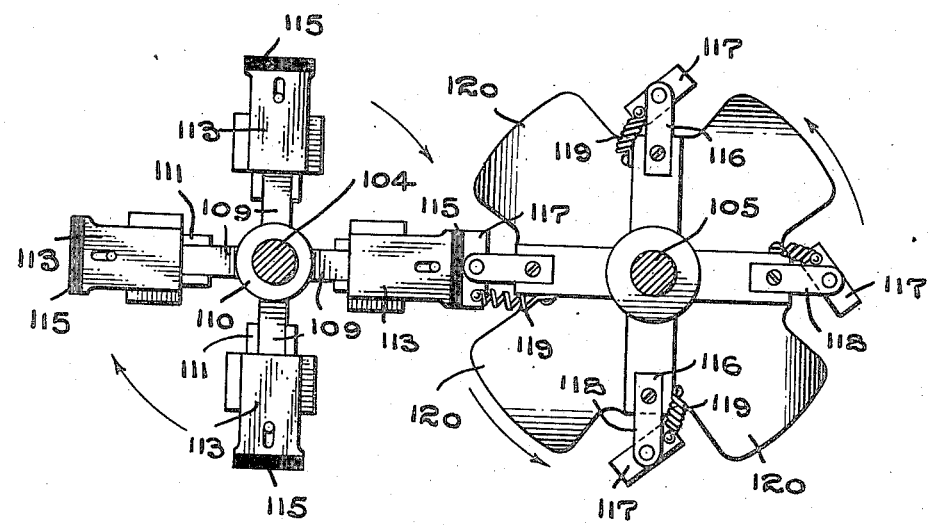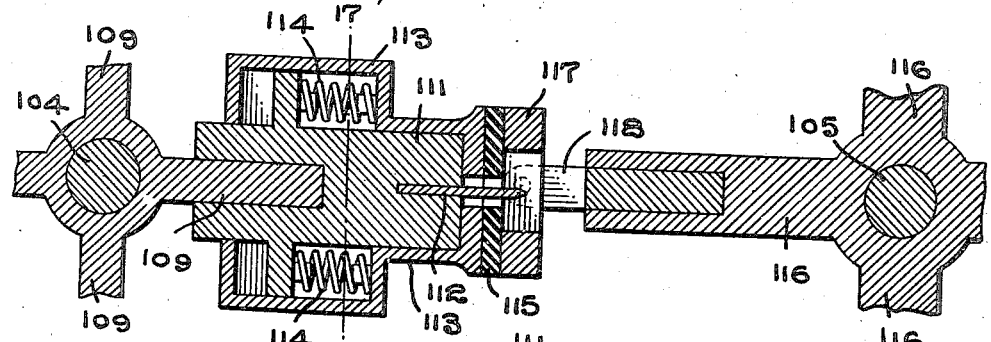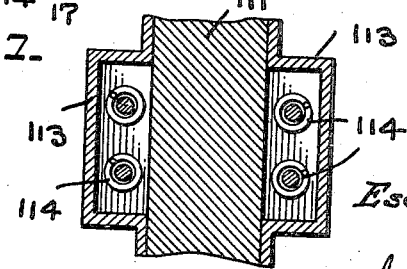

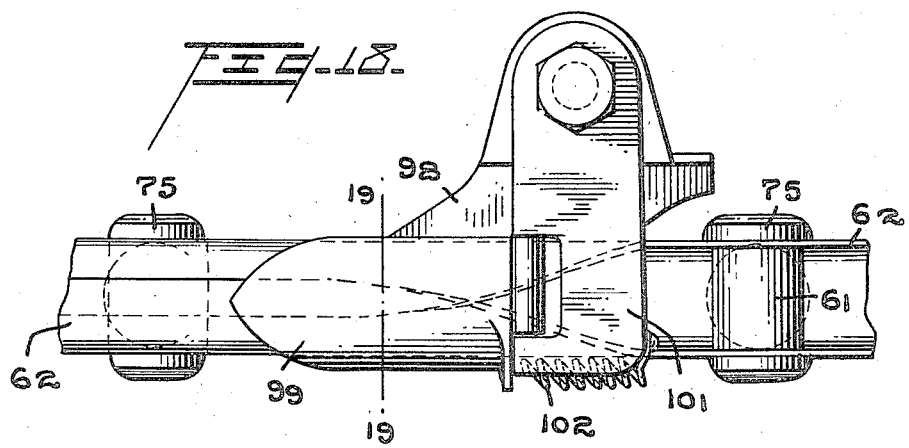
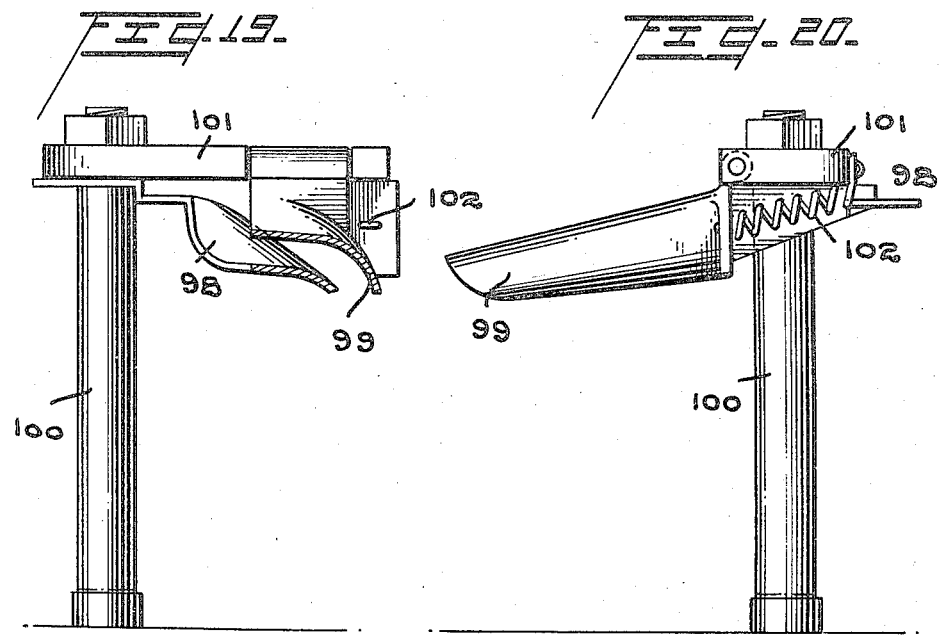

E. C. MILLER.
MACHINE FOR FORMING AND WRAPPING CONFECTIONS.
APPLICATION FILED APR. 12, 1915.
1,182,293.
Patented May 9, 1916.
14 SHEETS—SHEET 10.
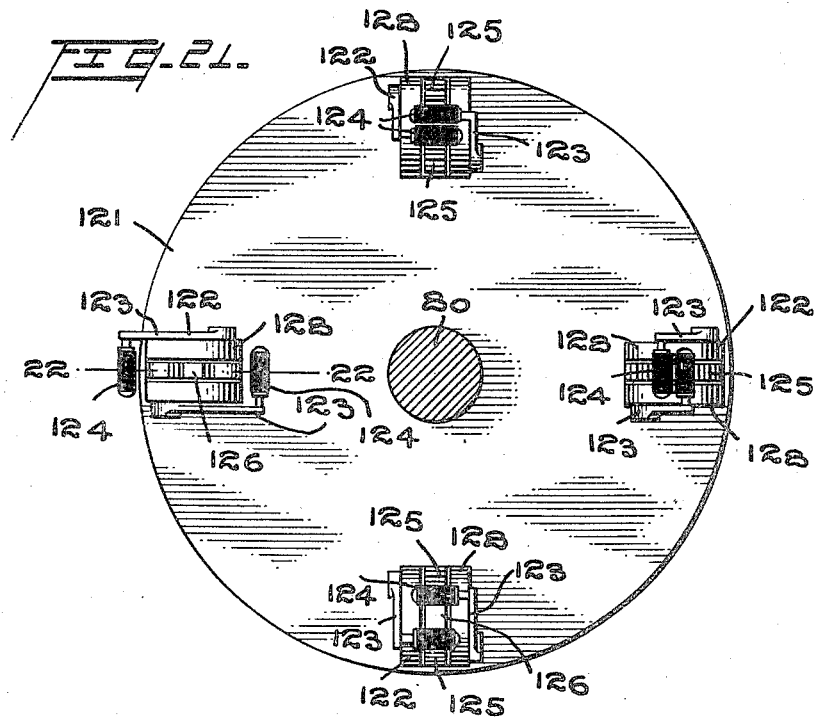
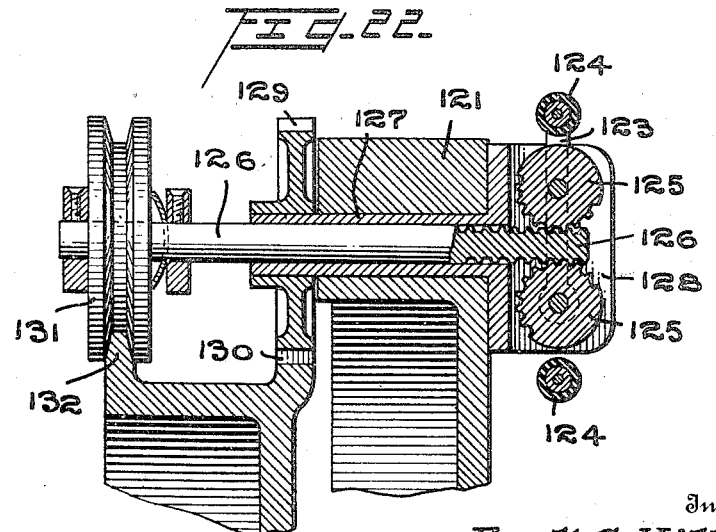
Witnesses
Inventor
Eseck C. Miller,
By Joshua R. H. Potts.
Attorney

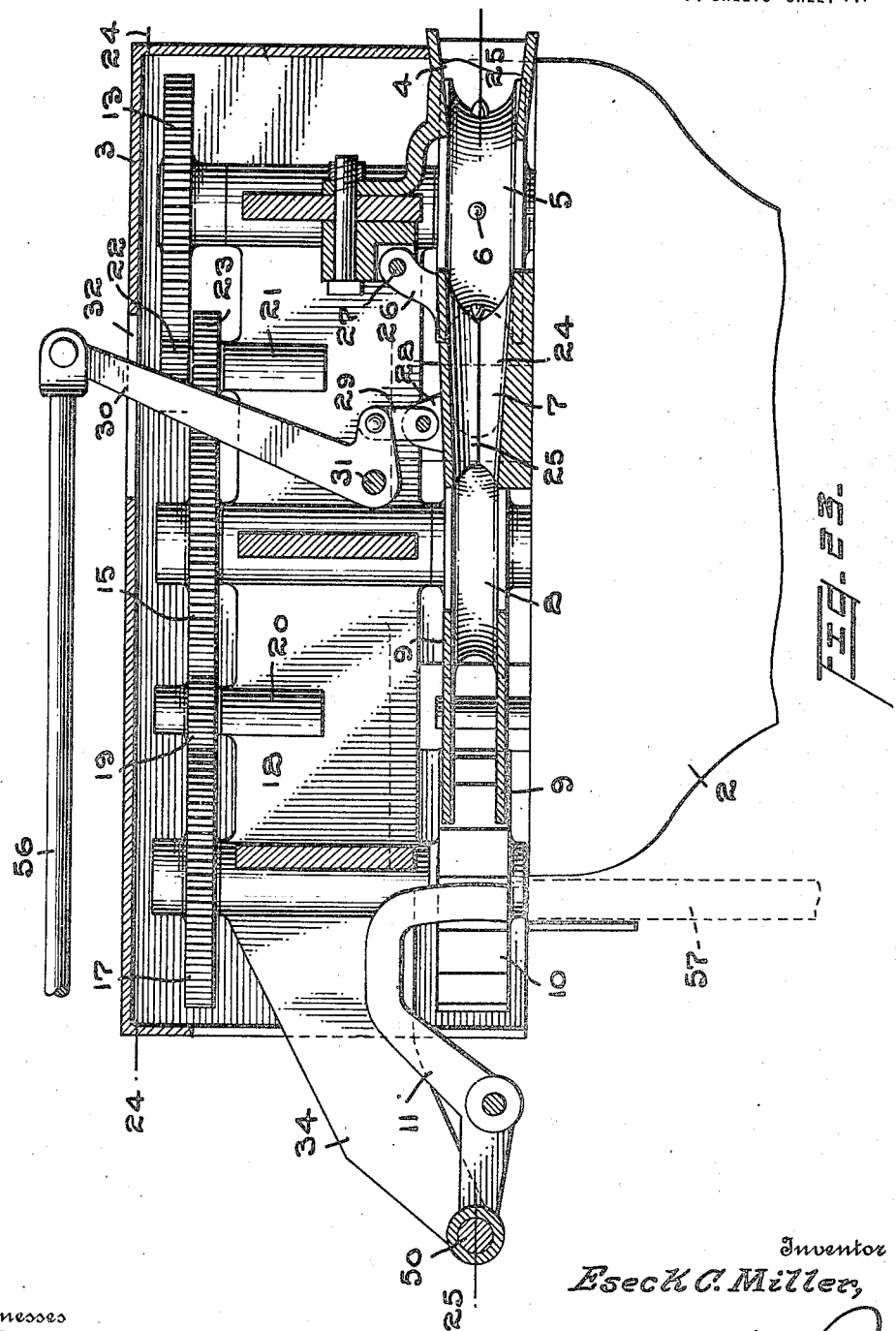

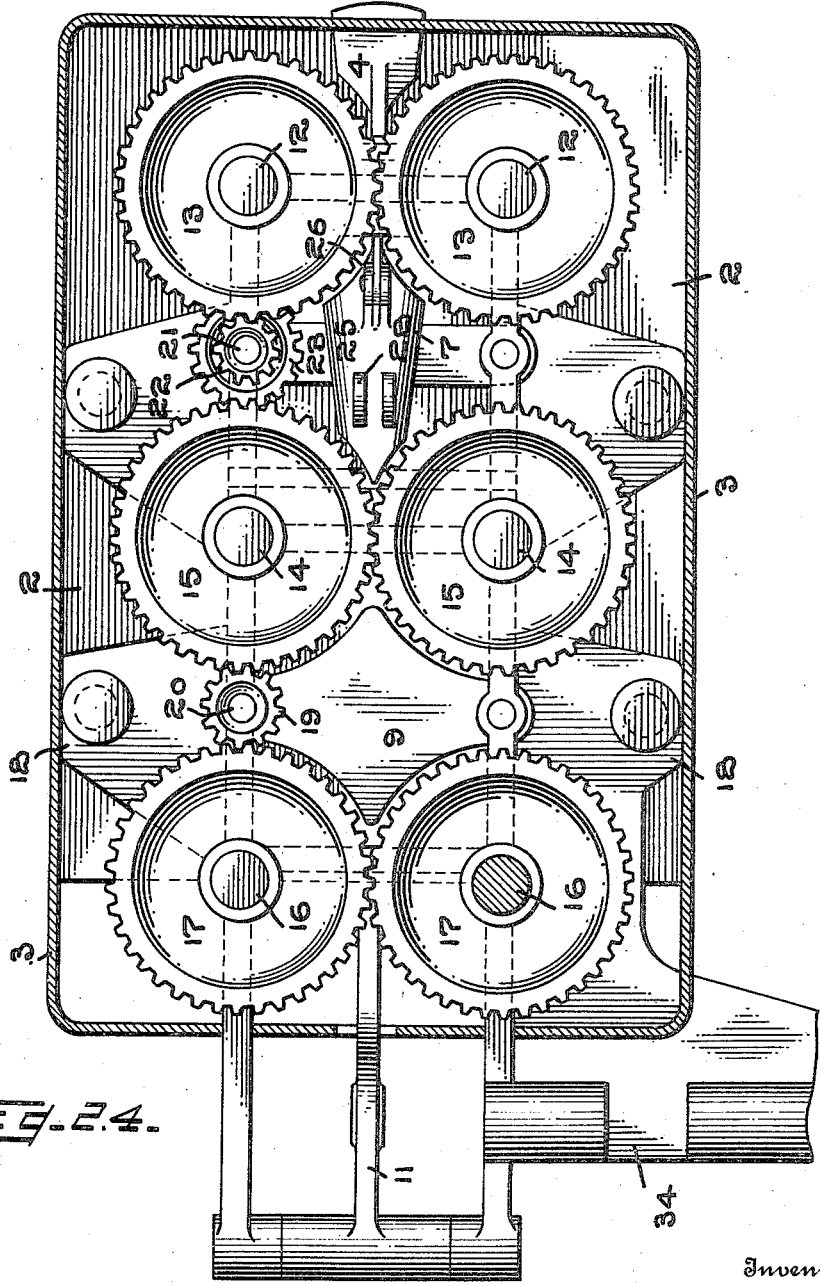

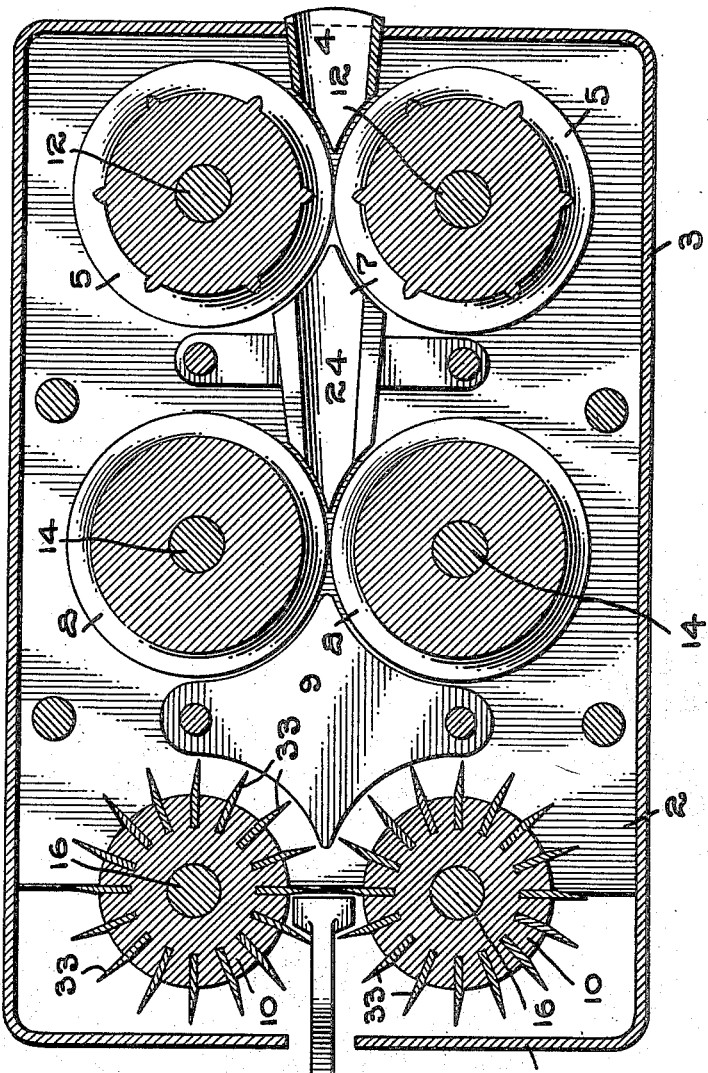

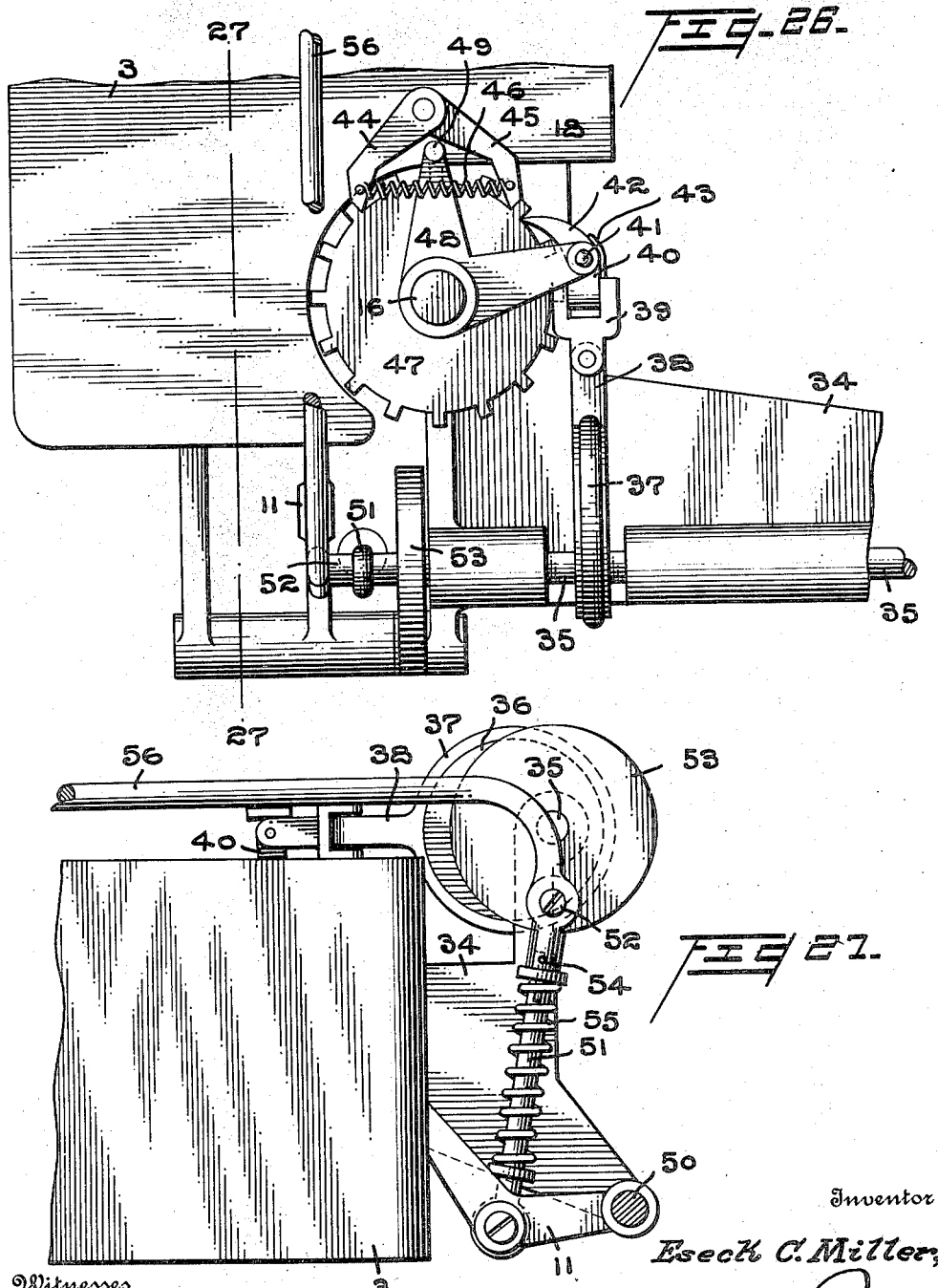

UNITED STATES PATENT OFFICE.

ESECK C. MILLER, OF TRENTON, NEW JERSEY.

MACHINE FOR FORMING AND WRAPPING CONFECTIONS.

1,182,293.

Specification of Letters Patent.

Patented May 9, 1916.

Application filed April 12, 1915. Serial No. 20,905.

*To all whom it may concern:*

Be it known that I, ESECK C. MILLER, a citizen of the United States, residing at Trenton, in the county of Mercer and State of New Jersey, have invented certain new and useful Improvements in Machines for Forming and Wrapping Confections, of which the following is a specification.

My invention relates to improvements in machines for forming and wrapping confections, the object of the invention being to provide a machine which will form the candy into a kiss or other similar confection, deposit the same into a continuously fed strip of wrapping paper, sever the strip into proper lengths, fold the strip over the kiss, and then twist the ends of the folded strip to form a secure inclosure for the kiss.

A further object is to provide an improved machine of the character stated in which the several operations of handling and wrapping the candy are exposed to view, so that the machine presents an attractive and interesting appearance, and handles the candy in a sanitary manner, performing the entire wrapping operation without coming in contact with the hands of the operator.

A further object is to provide a machine of the character stated with improved means for forming the candy into small pieces or kisses, and provide improved means for conveying the kisses to the wrapping paper, presenting the kisses to the wrapping paper in the direction of feed of the latter, and insuring the proper positioning of the candy in movable clamps located outside of the wrapping paper, and adapted to convey the candy and the paper to a cutter, and to twisting mechanism before dropping the candy in its completely wrapped form.

A further object is to provide a machine of the character stated in which the several parts coöperate in the forming and wrapping of the candy kisses or similar confections, in which the operation is rapidly and economically performed, and which embodies in its construction many coöperating features and elements in the performance of the functions for which it is intended.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved machine. Fig. 2 is a view in vertical longitudinal section omitting the candy forming mechanism. Fig. 3 is a view in horizontal section taken on the staggered line 3—3 of Fig. 2. Fig. 4 is a view in elevation illustrating the rotary candy conveyer and coöperating parts illustrating how the conveyer presents a candy kiss to the wrapping paper between the candy clamp. Fig. 5 is a perspective view of one of the candy kisses wrapped by my improved machine. Fig. 6 is a view in rear elevation of the rotary conveyer shown in Fig. 4 and illustrating in section the cam which controls the movement of the several candy gripping jaws. Fig. 7 is a fragmentary view in section on the line 7—7 of Fig. 6. Fig. 8 is an edge view of one of the crank arms which are secured to and operate the candy clamping jaws. Fig. 9 is a perspective view of the cam shown in section in Fig. 6. Fig. 10 is a perspective view illustrating the cams which control the movement of the candy clamps. Fig. 11 is a view partly in section and partly in elevation illustrating one of the candy clamps showing the same with its movable jaw in open position. Fig. 12 is a view similar to Fig. 11 showing the jaws of the candy clamp in closed position. Fig. 13 is a perspective view of one of the candy clamps, showing the same in its normal feeding position. Fig. 14 is a view similar to Fig. 13 showing the candy clamp at right angles to its position shown in Fig. 13, and in this last-named position the clamp holds the candy and wrapper in position for twisting the ends of the wrapper. Fig. 15 is a sectional plan view illustrating the paper cutting mechanism. Fig. 16 is a fragmentary view in horizontal section illustrating one of the cutters and coöperating parts. Fig. 17 is a view in section on the line 17—17 of Fig. 16. Fig. 18 is a fragmentary plan view illustrating the paper folders. Fig. 19 is a view in section on the line 19—19 of Fig. 18. Fig. 20 is a view in elevation at right angles to Fig. 18. Fig. 21 is an inner face view of one of the rotary disks 121 carrying the paper twisters. Fig. 22 is a fragmentary view in section on an enlarged scale on the line 22—22 of Fig. 21. Fig. 23 is a view in vertical longitudinal section through the center of the candy forming mechanism. Fig. 24 is a view in horizontal section on the line 24—24 of Fig. 23. Fig. 25 is a view in horizontal section on the line 25—25 of Fig. 23. Fig. 26 is a fragmentary view on an enlarged scale in top plan illustrating the power transmission mechanism controlling the operation of the candy forming mechanism, and Fig. 27 is a view partly in elevation and partly in section, the section being taken on the line 27—27 of Fig. 26.

My improved machine has six (6) distinct operations, namely, a candy forming mechanism, a candy transferring mechanism, a candy and paper feeding mechanism, a paper folding mechanism, a paper cutting mechanism, and a paper twisting mechanism, all coöperating in the complete operation of making a wrapped confection, and for convenience of description, I shall hereinafter consider these several parts of the machine in order, which is the regular order of operation.

*Candy forming mechanism.*—In the accompanying drawings, I have illustrated as a support a relatively heavy base 1, having an upright 2, supporting a casing 3 at the extreme top of the machine, and this casing 3 incloses the coöperating features of the candy forming mechanism above referred to.

The candy enters the rear end of the casing through an inlet 4, and is fed forwardly between two feeding rolls 5, said feeding rolls preferably having convex peripheries with pointed lugs 6 to grip the candy and compel it to feed forwardly through a compression device 7, and from the latter between pressure rolls 8, thence between guide plates 9 to rotary cutters 10, and from the cutters 10 the candy kiss which is formed by the cutters is forced downwardly by means of a kicker 11, all of which parts will now be described in detail.

The feeding rolls 5 are secured to vertical shafts 12 having intermeshing gears 13 at their upper ends. The pressure rolls 8 are secured to vertical shafts 14 having intermeshing gears 15 at their upper ends. The cutters 10 are secured to vertical shafts 16 having intermeshing gears 17 at their upper ends, and all of said shafts are supported in a casting or frame 18, which latter will be shaped to embody the maximum of strength without undue weight.

The gears 15 and 17 are in the same horizontal plane, and one gear 17 is connected with a gear 15 by means of an idler 19 on a stub 20 supported in frame 18. The gears 13 are in a higher horizontal plane than gears 15 and 17, and a stub 21 supported in frame 18 carries two pinions 22 and 23 respectively of different diameters, the smaller pinion 22 meshing with one of the gears 13, while the larger pinion 23 meshes with one of the gears 15, so that it will be noted that all of the shafts are compelled to turn in unison and the sizes and arrangement of gears will be in accordance with the candy feed desired.

The compression device 7 constitutes a lower stationary semi-conical member 24, and an upper similarly shaped oscillating member 25. The upper member 25 is pivotally connected to the frame 18 by means of a perforated lug 26, and a pivot pin 27, and is provided with a perforated ear 28 which is connected by a link 29 with an L-shaped lever 30.

Lever 30 is pivoted at its angle on a pin 31 supported in frame 18, and its longer end projects through a slot 32 in the top of casing 3, and receives a continuous oscillating movement to oscillate the member 25 and compress the candy as it is fed from the rolls 5 to the rolls 8, so that the candy is greatly reduced in diameter, and after leaving the rolls 8 moves between the guide plates 9 of the proper diameter for cutting.

The cutters 10, as shown clearly in Fig. 25, are provided with a circular series of radially positioned blades 33, and the blades of one cutter join with the blades of the other to sever the candy into blocks or kisses, and for convenience of description I shall hereinafter refer to the piece of candy which is wrapped as a "kiss."

On the forward end of the casing 3, a bracket 34 is secured and supports a shaft 35 which constitutes the drive shaft of the candy forming mechanism. On this shaft 35, an eccentric 36 is secured around which a strap 37 is located, and secured to a link 38. The link 38 is connected by a universal joint 39 with a block 40, and the latter supports a vertical pin 41 which is shown clearly in plan in Fig. 26, but is hid by the casing in Fig. 27.

On the pin 41, a pawl 42 is pivotally mounted, and pressed by a spring 43 into engagement with a toothed wheel 47. This toothed wheel 47 is located in a higher plane than the gear 17, and is secured on the cutter shaft 16 shown at the right of Fig. 25.

Two oppositely positioned pivoted dogs 44 and 45 connected adjacent their free ends by a coiled spring 46, engage the toothed wheel 47, and normally hold the wheel against movement, and before the toothed wheel can be turned in a direction to feed the candy, it is necessary to move the dog 45 out of operation, and this is done by means of an angle lever 48 fulcrumed at its angle on shaft 16. One arm of this angle lever 48 is provided with a lug 49, which engages the face of dog 45, and the other arm of the angle lever is pivotally connected to the pin 41. By reason of this construction, the movement of link 38 in one direction serves to retract the pawl 42 on the face of toothed wheel 47, and also through the medium of lever 48 and lug 47 force the dog 45 away from the toothed wheel and hold it away from the toothed wheel during the opposite movement of link 38, or in other words until the dog 45 moves into engagement with one of the teeth on wheel 47, so that the pawl 42 operates to impart an intermittent movement to the shaft 16 and the entire candy feeding mechanism, so that the candy is fed intermittent step by step in just the quantity necessary to form the kisses, and hence while the kiss is being forced downwardly by the kicker 11, the cutters and other feeding mechanism will be at a stand still.

The kicker 11 is pivotally supported at one end on a journal bolt 50, and near its pivoted end is connected by a link 51 with a crank pin 52 on a crank disk 53, said crank disk secured to the shaft 35. The link 51 is made up of two telescoping parts having a slot and pin connection 54, and provided with a coiled spring 55 holding the two parts of the link in normal extended position and operating as a cushion to prevent damage in the event the kicker should move downwardly and meet resistance in such movement. The crank pin 52 also connects a rod 56 with the crank disk, and this rod 56 is connected to the upper end of the lever 30 to impart the necessary oscillating movement to the latter.

*Candy transferring mechanism.*—My improved transferring mechanism is located below the free end of the kicker 11, and operates to transfer the candy kisses from the candy forming mechanism above described to the candy and paper feeding mechanism located below, and with reference to this transferring mechanism, attention is called particularly to Figs. 1, 2, 4, 6, 7, 8, and 9.

The transferring mechanism comprises a rotary disk 57 secured to turn with the shaft 58, and provided around its outer edge with a circular series of fixed jaws 59. The disk 57 also carries a series of pivoted jaws 60 coöperating with the fixed jaws 59 to clamp the candy kisses 61 and convey the same into the paper wrapper strip 62 below.

The jaws 60 are secured to short shafts 63 which project through the disk 57, and are provided on their inner ends with crank arms 64. Each crank arm is provided with a coiled spring 65 connecting the same with the rear face of the disk, and exerting a pull on the arm tending to move the pivoted jaw toward the fixed jaw, and this movement is controlled by a stationary cam 65$^a$ against which rollers 66 on the crank arms 64 are adapted to bear.

The wrapper strip 62 is feeding in the direction of the arrow in Fig. 4, and the disk 57 is turning in the direction indicated by the arrow, so that the candy kiss which is received at the top of the transferring device is released at the bottom, and is moving in the direction of feed of the paper.

The kiss is held by the spring pressure on the pivoted jaws, and the opening movement is a positive one due to the engagement of the rollers 66 with cam 65$^a$. After the kiss is deposited in the paper strip, the crank arm 64 of the lowermost pivoted jaw engages the end 67 of the cam 65$^a$, and quickly moves to open position as indicated at the right of Fig. 4.

As the pivoted jaw reaches the top of the transferring device, it is held against movement momentarily by reason of the peculiar shape of the end 68 of cam 65$^a$, and remains substantially at a stand still until the fixed jaw 59 moves over to the position to receive the kiss, when the crank arm of said movable jaw rides off the end of the cam and the spring 65 exerts the necessary pressure to clamp the kiss between the jaws.

*Candy and paper feeding mechanism.*— The wrapper strip 62 is fed from a supply roll 69 around a tension device 70, thence over a roller 71, and thence around a shaper 72 which gives to the paper a general U-shape in cross section as shown clearly in Fig. 11. The paper strip in this general U-shape is guided between the jaws 73 and 74 of candy clamps 75. These clamps 75 are supported by an endless chain 76 which is mounted upon wheels 77 and 78 respectively, and these wheels are shown of general octagonal form with flat faces corresponding in length to the length of the links of the chain, but it is of course to be understood that the chain may be driven by any other means.

The wheels 77 and 78 are secured to shafts 79 and 80 respectively, and shaft 79 is mounted in suitable bearings 81 preferably adjustably secured in the base 1. Shaft 80 constitutes the drive shaft for the chain, and is located in supporting arms 82 projecting beyond the base 1 to properly locate the parts for dropping the candy as will be more fully hereinafter explained.

It is to be understood that the chain 76 carries a series of candy clamps in such number and spaced apart so as to receive the candy kisses as they are deposited by the transferring mechanism, and as shown clearly in the drawings, each successive candy clamp presents itself to the transferring device to receive the candy kiss.

Each candy clamp consists of a post 83 having rotary mounting on the link of the chain to which it is connected, and provided at its base with two crank arms 84 and 85 located at right angles to each other. The crank arms 84 and 85 are provided on their upper faces with rollers 86 and 87 respectively, and are adapted to engage cams 88 and 89 respectively to turn the candy clamp and hold the same in either of two positions as will be explained.

The cams 88 and 89 are illustrated in perspective in Fig. 10, in which it will be noted that the said cams constitute relatively long U-shaped bars which are supported on the base 1 in proper position to compel the candy clamps to turn as will be explained, and in order to limit the turning movement in both directions, fixed lugs 90 are provided on the chain links against which the arms 84 and 85 engage.

The rotary post 83 of each candy clamp 75 has a clamping collar 91 thereon to which the jaw 73 of the candy clamp is pivotally connected as shown at 92, and is normally held in clamping position by a coiled spring 93. The jaw 74 of each candy clamp constitutes a fixed jaw, while the jaw 73 is movable and held in closed position by the spring 93.

Each movable jaw 73 of each candy clamp 75 is provided on its outer surface with a roller 94 which is adapted to engage cams 95 and 96 to move the movable jaws away from the fixed jaws at the proper time during the operation of the machine, one of these cams being located at the left of the machine shown in Fig. 2 to hold the clamp in open position, just previous to the reception of the candy kiss, and then permitting the clamp to close, gripping the candy kiss and the paper, and causing the paper to move at the proper speed. This engagement is augmented by reason of the fact that the inner faces of the jaws 73 and 74 are roughened or serrated as shown clearly at 97.

The cam 96 is located at the lower portion of the chain at the right of the machine as shown clearly in Fig. 2 to compel the candy clamps to open and release the wrapped kiss.

*Paper folding mechanism.*—As the wrapper strip 62 is fed forwardly, its upwardly projecting edges encounter two folders 98 and 99. This folding mechanism is illustrated most clearly in detail in Figs. 18, 19, and 20, in which it will be noted that both folders are supported upon a standard 100, and that the folder 98 which turns down the strip of paper at one side is slightly in advance of the folder 99 which turns down the other side of the paper strip on top of the first fold. Furthermore, it will be noted that the folder 99 is pivotally connected to a laterally projecting arm 101, and is provided with a coiled spring 102 so as to exert an elastic pressure to hold the paper down with sufficient force to prevent it from upward movement until the paper reaches a position under a curved strip 103, which latter holds the paper in folded position until the ends are twisted together.

*Paper cutting mechanism.*—The paper in its folded form, next moves into position to be cut, and these cutters are illustrated in detail in Figs. 15, 16, and 17. Parallel vertical shafts 104, and 105, respectively are located at opposite sides of the chain 76, and these shafts at their lower ends are connected by mitre gears 106 with laterally projecting shafts 107 extending to opposite sides of the machine. These shafts 107 are connected by gear trains 108 with the shaft 80, and operate in unison. On the vertical shaft 104, a hub 110 is secured and supports a series of radially positioned arms 109. Each arm 109 supports a block 111 having a vertically positioned blade 112 at its outer end.

The blade 112 of each cutter is normally concealed within a housing 113 which is mounted to slide on the block 111, and is provided with springs 114 which press the housing outwardly, covering the cutting blades.

A rubber facing 115 is provided on the outer end of each housing, and between this rubber facing and a slotted block 117, the paper strip is compressed as will be hereinafter pointed out.

On the shaft 105, a rotary frame 116 is secured, and this frame 116 carries a circular series of slotted blocks 117, each slotted block pivotally connected to bars 118 and having a coiled spring 119 tending to hold the block at an angle to the bar as shown clearly in Fig. 15.

Between the bars 118, paper covering plates 120 are provided, and these plates serve to extend over the overlapping folded edges of the paper and prevent any opening of the package during the cutting operation. As each cutter approaches its coöperating block 117, the paper will be compressed and the pressure of the housing or rather the rubber facing 115 of the housing against the block 117 will serve not only to hold the paper taut, but also force the housing rearwardly and permit the cutting blade to sever the paper. This cutting operation is neatly and positively performed by reason of the manner in which the paper is held. It is of course, to be understood that the folded paper strip is severed an equal distance at both sides of the candy clamp, so that the candy will be located midway between the ends of the cut strip.

*Paper twisting mechanism.*—After the paper is cut, the candy clamps 75 encounter the cam 88, and are turned at right angles to the normal feed as shown clearly in Fig. 14, so that the folded paper will be turned at right angles, and in such position carried around the wheel 78.

On the shaft 80, two relatively large disks 121 are secured, and these disks on their inner faces support a circular series of twisters 122. These twisters are shown in detail in Figs. 21 and 22, and it will be noted that while I have illustrated each disk as equipped with four of such twisters, the invention is not limited to the number, as I will employ as many as are needed as they are fed by the candy clamps.

Each twister consists of two crank arms 123 carrying at their free ends, rubber covered rollers 124 which are located in parallelism, and are adapted to grip the ends of the paper. The crank arms 123 are secured to turn with gear segments 125, the latter in mesh with a rack 126. The rack 126 is preferably in the form of a rotary shaft having annular teeth thereon which are capable of longitudinal as well as rotary movement, and the said racks extend through sleeves 127 carrying at their inner ends brackets 128 in which the segments 125 are mounted.

The sleeves 127 are provided with pinions 129 which run upon stationary racks 130, so that during the movement of the disks, a rotary motion is imparted to each twister. The racks 126 which control the opening and closing movement of the twisters are provided with grooved rollers 131 which engage cams 132 on a fixed part of the machine, and these cams compel the racks 126 to move longitudinally to separate or move the rollers 124 together.

The candy clamps 75 in regular succession bring the packages to be twisted into place between the disks 121 and at right angles to the normal feed of the paper. The rollers 124 are apart when the package moves into position between the disks, and then the rollers move together to grip the ends of the paper, and while firmly holding them, the rotary movement of sleeve 127 compels the twisting of the paper to secure the candy kiss therein.

By reason of the construction above described the rollers 124 not only firmly grip the paper, but they also allow the paper to move longitudinally between the rollers to compensate for the shortening of the package due to the twisting action. After the ends are thoroughly twisted, the cam 132 operates to move the racks 126 longitudinally, and separating the rollers 124 to release the paper. The candy clamps 75 then encounter cam 89, which compels the candy clamps to open and drop the wrapped candy kiss, which latter falls into a basket 133 or other receptacle provided for the purpose.

My invention is of course not limited to any particular means for transmitting power to the respective shafts, but I have illustrated as a convenient power transmission, the following:—A motor 134 is supported on the base 1 and drives a belt 135 which turns a pulley 136. The pulley 136 is secured on a shaft 137 carrying a gear 138, the latter in mesh with a gear 139 above, which is secured to a shaft 140. A sprocket wheel 141 on shaft 140 is connected by a chain 142 with a sprocket wheel 143 on shaft 80, and from the shaft 80 motion is transmitted to the shafts 107 above referred to by the gear trains 108. The cutter shaft 104 extends up to and is supported in the bracket 34, and the upper end of this shaft 104 is connected by miter gears 144 with the shaft 35. The paper strip 62 is not positively driven, but is dragged along by the action of the candy clamps 75 which grip the paper at opposite sides of the candy and draw the same along properly spaced apart, and all of the features of the machine operating in unison and properly timed so as to produce the results above set forth. One of the shafts 107 is provided with a sprocket wheel 145 connected by an endless chain 146 with a sprocket wheel 147 secured to turn with the shaft 58, and impart rotary movement to the disk 57.

The operation of the machine is briefly as follows: The candy is fed through the casing 3 and severed into blocks or kisses by the cutters 33. The kicker 11 operates to knock out the kiss or piece of candy from between the blades of the cutters into the space between the jaws 59 and 60 of the transferring disk 57, the latter conveys the candy kisses into position between the U-shaped wrapper strip 62, and between the jaws 73 and 74 of the candy clamps 75, the latter are fed forwardly by the chain 76 and the paper is turned inwardly and pressed downwardly by the folders 98 and 99. The cutting blades 112 next sever the paper into the proper lengths, cutting the same at opposite sides of the candy kiss. The candy clamps then turn forty-five degrees (45°) by reason of contact with the cam 88, so that the folded paper is positioned at right angles to the normal feed of the paper, and in this last-named position, the twisters 122 grip the ends of the paper and twist the paper so as to securely inclose the candy kiss. The twisters then open to release the ends of the paper, and the candy clamps open to drop the wrapped candy kiss, so that the operation from the candy forming to the complete package is entirely mechanical and continuous.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a mechanism of the character described, the combination with means for feeding a continuously moving wrapper strip, means for depositing candy in the strip, means for cutting the strip at opposite sides of the candy, means for turning the cut strips at an angle to the normal feed thereof, and means for twisting the ends of the cut strip at opposite sides of the candy therein, substantially as described.

2. In a mechanism of the character described, the combination with means for feeding a continuously moving wrapper strip, means for depositing candy in the strip, means for folding the strip about the candy, means for cutting the strip at opposite sides of the candy, means for turning the cut strips at an angle to the normal feed thereof, and means for twisting the ends of the cut strip at opposite sides of the candy therein, substantially as described.

3. In a machine of the character described, the combination with candy forming mechanism, of means for supporting a continuously moving wrapper strip, means for transferring the candy from the forming mechanism to the wrapper, means for folding the strip about the candy, means for cutting the folded strip at opposite sides of the candy, means for turning the cut candy strip at right angles to the direction of feed, and means for twisting the ends of the cut strip while in the last-named position, substantially as described.

4. In a machine of the character described, the combination with an endless conveyer, of a series of candy clamps on the conveyer, means for directing a wrapper strip in U-shaped formation into the candy clamps, means for feeding candy into the wrapper in the candy clamps, means for cutting the wrapper between the candy clamps, and means for twisting the cut ends of the wrapper, substantially as described.

5. In a machine of the character described, the combination with an endless conveyer, of a series of candy clamps on the conveyer, means for directing a wrapper strip in U-shaped formation into the candy clamps, means for feeding candy into the wrapper in the candy clamps, means for cutting the wrapper between the candy clamps, means for turning the candy clamps at right angles to the normal direction of feed, and means for twisting the ends of the wrapper while the clamps are in the last-named position, substantially as described.

6. In a machine of the character described, the combination with an endless conveyer, of a series of candy clamps on the conveyer, means guiding a wrapper strip in U-shaped formation into the candy clamps, a candy forming mechanism, a transferring mechanism constructed to convey a piece of candy from the forming mechanism into the wrapper inside of the candy clamps, means for folding the wrapper on the candy, means for cutting the wrapper between the candy clamps, and means for twisting the ends of the cut wrapper, substantially as described.

7. In a machine of the character described, the combination with an endless conveyer, of a series of candy clamps on the conveyer, means guiding a wrapper strip in U-shaped formation into the candy clamps, means for feeding pieces of candy into the wrapper within the clamps, and means for cutting the wrapper and twisting the ends together, substantially as described.

8. In a machine of the character described, the combination with an endless conveyer, of a series of candy clamps on the conveyer, means guiding a wrapper strip in U-shaped formation into the candy clamps, a candy forming mechanism located above the conveyer, a transferring mechanism between the forming mechanism and the conveyer comprising a rotary disk having a circular series of candy gripping jaws thereon adapted to receive the candy from the forming mechanism and deposit it into the wrapper between the first-mentioned candy clamps, and means for cutting the wrapper between the candy clamps and twisting the ends thereof, substantially as described.

9. In a machine of the character described, the combination with an endless conveyer, of a series of candy clamps on the conveyer, means guiding a wrapper strip in U-shaped formation into the candy clamps, a candy forming mechanism located above the conveyer, a transferring mechanism between the forming mechanism and the conveyer comprising a rotary disk having a circular series of candy gripping jaws thereon adapted to receive the candy from the forming mechanism and deposit it into the wrapper between the first-mentioned candy clamps, means for folding the wrapper onto the candy, means for cutting the wrapper between the candy clamps, and means for twisting the ends of the wrapper at opposite sides of the candy clamps, substantially as described.

10. In a machine of the character described, the combination with an endless conveyer, of a series of candy clamps on the conveyer, means guiding a wrapper strip in U-shaped formation into the candy clamps, candy forming mechanism above the conveyer, a rotary disk between the candy forming mechanism and the conveyer, said disk having a circular series of fixed jaws thereon, and a circular series of pivoted jaws coöperating with the fixed jaws to grip pieces of candy from the forming mechanism and direct them into the wrapper in the candy clamps, a fixed cam controlling the movement of the pivoted jaws, whereby the latter release the candy when in the candy clamps, means for folding the wrapper on the candy, means for cutting the wrapper between the candy clamps, and means for twisting the ends of the cut wrapper, substantially as described.

11. In a machine of the character described, the combination with candy forming mechanism, of an endless series of movable candy clamps supporting a continuously moving wrapper strip, means for transferring the candy from the forming mechanism to the wrapper, means for cutting the wrapper into lengths, turning the clamps at an angle and twisting the ends of the wrapper at opposite sides of the candy therein, said candy clamps comprising fixed and movable jaws, springs normally pressing the jaws together, and cams opening the jaws for the admission and release of the candy, substantially as described.

12. In a machine of the character described, the combination with candy forming mechanism, of an endless series of movable candy clamps supporting a continuously moving wrapper strip, means for transferring the candy from the forming mechanism to the wrapper, means for folding the strip about the candy, means for cutting the folded strip at opposite sides of the candy, means for turning the cut strips at an angle to the normal feed thereof, means for twisting the ends of the cut strip, said candy clamps comprising fixed and movable jaws, springs normally pressing the jaws together, and cams openings the jaws for the admission and release of the candy, substantially as described.

13. In a machine of the character described, the combination with candy forming mechanism, of an endless series of movable candy clamps supporting a continuously moving wrapper strip, means for transferring the candy from the forming mechanism to the wrapper, means for folding the strip about the candy, means for cutting the folded strip at opposite sides of the candy, means for turning the cut candy strip at right angles to the direction of feed, means for twisting the ends of the cut strip while in the last-named position, said candy clamps comprising fixed and movable jaws, springs normally pressing the jaws together, and cams opening the jaws for the admission and release of the candy, substantially as described.

14. In a machine of the character described, the combination with an endless conveyer, of a series of candy clamps on the conveyer, means for directing a wrapper strip in U-shaped formation into the candy clamps, means for feeding candy into the wrapper in the candy clamps, means for cutting the wrapper between the candy clamps, means for twisting the cut ends of the wrapper, said candy clamps comprising fixed and movable jaws, springs normally pressing the jaws together, and cams opening the jaws for the admission and release of the candy, substantially as described.

15. In a machine of the character described, the combination with an endless conveyer, of a series of candy clamps on the conveyer, means for directing a wrapper strip in U-shaped formation into the candy clamps, means for feeding candy into the wrapper in the candy clamps, means for cutting the wrapper between the candy clamps, means for turning the candy clamps at right angles to the normal direction of feed, means for twisting the ends of the wrapper while the clamps are in the last-named position, said candy clamps comprising fixed and movable jaws, springs normally pressing the jaws together, and cams opening the jaws for the admission and release of the candy, substantially as described.

16. In a machine of the character described, the combination with an endless conveyer, of a series of candy clamps on the conveyer, means guiding a wrapper strip in U-shaped formation into the candy clamps, a candy forming mechanism, a transferring mechanism constructed to convey a piece of candy from the forming mechanism into the wrapper inside of the candy clamps, means for folding the wrapper on the candy, means for cutting the wrapper between the candy clamps, means for twisting the ends of the cut wrapper, said candy clamps comprising fixed and movable jaws, springs normally pressing the jaws together, and cams opening the jaws for the admission and release of the candy, substantially as described.

17. In a machine of the character described, the combination with an endless conveyer, of a series of candy clamps on the conveyer, means guiding a wrapper strip in U-shaped formation into the candy clamps, means for feeding pieces of candy into the wrapper within the clamps, means for cutting the wrapper and twisting the ends together, said candy clamps comprising fixed and movable jaws, springs normally pressing the jaws together, and cams opening the jaws for the admission and release of the candy, substantially as described.

18. In a machine of the character described, the combination with an endless conveyer, of a series of candy clamps on the conveyer, means guiding a wrapper strip in U-shaped formation into the candy clamps, a candy forming mechanism located above the conveyer, a transferring mechanism between the forming mechanism and the conveyer comprising a rotary disk having a circular series of candy gripping jaws thereon adapted to receive the candy from the forming mechanism and deposit it into the wrapper between the first-mentioned candy clamps, and means for cutting the wrapper between the candy clamps and twisting the ends thereof, said candy clamps comprising fixed and movable jaws, springs normally pressing the jaws together, and cams opening the jaws for the admission and release of the candy, substantially as described.

19. In a machine of the character described, the combination with an endless conveyer, of a series of candy clamps on the conveyer, means guiding a wrapper strip in U-shaped formation into the candy clamps, a candy forming mechanism located above the conveyer, a transferring mechanism between the forming mechanism and the conveyer comprising a rotary disk having a circular series of candy gripping jaws thereon adapted to receive the candy from the forming mechanism and deposit it into the wrapper between the first-mentioned candy clamps, means for folding the wrapper onto the candy, means for cutting the wrapper between the candy clamps, means for twisting the ends of the wrapper at opposite sides of the candy clamps, said candy clamps comprising fixed and movable jaws, springs normally pressing the jaws together, and cams opening the jaws for the admission and release of the candy, substantially as described.

20. In a machine of the character described, the combination with an endless conveyer, of a series of candy clamps on the conveyer, means guiding a wrapper strip in U-shaped formation into the candy clamps, candy forming mechanism above the conveyer, a rotary disk between the candy forming mechanism and the conveyer, said disk having a circular series of fixed jaws thereon, and a circular series of pivoted jaws coöperating with the fixed jaws to grip pieces of candy from the forming mechanism and direct them into the wrapper in the candy clamps, a fixed cam controlling the movement of the pivoted jaws, whereby the latter release the candy when in the candy clamps, means for folding the wrapper on the candy, means for cutting the wrapper between the candy clamps, means for twisting the ends of the cut wrapper, said candy clamps comprising fixed and movable jaws, springs normally pressing the jaws together, and cams opening the jaws for the admission and release of the candy, substantially as described.

21. In a machine of the character described, the combination with an endless conveyer, of a series of candy clamps having rotary mounting on the conveyer, means for directing a wrapper strip in U-shaped formation into the candy clamps, means for depositing pieces of candy into the wrapper in the clamps, means for folding the wrapper on the candy in the clamps, means for cutting the wrapper between the clamps, means for turning the clamps at right angles to the normal feed thereof, and twisters constructed to twist the ends of the paper at opposite sides of the clamps when the latter are in the last-named position, substantially as described.

22. In a machine of the character described, the combination with an endless conveyer, of a series of candy clamps having rotary mounting on the conveyer, means for directing a wrapper strip in U-shaped formation into the candy clamps, means for depositing pieces of candy into the wrapper in the clamps, means for folding the wrapper on the candy in the clamps, means for cutting the wrapper between the clamps, means for turning the clamps at right angles to the normal feed thereof, rotary twisters constructed to engage the ends of the paper when the candy clamps are in the last-named position, and rollers on the twisters engaging the paper, substantially as described.

23. The combination with an endless conveyer, of candy clamps having rotary mounting on the conveyer, means for depositing wrappers and pieces of candy in the clamps during the normal feed of the conveyer, means for turning the candy clamps at right angles to the normal direction of feed, and twisters adapted to engage the ends of the wrapper when the candy clamps are in the last-named position, substantially as described.

24. The combination with an endless conveyer, of candy clamps having rotary mounting on the conveyer, means for depositing wrappers and pieces of candy in the clamps during the normal feed of the conveyer, means for turning the candy clamps at right angles to the normal direction of feed, twisters adapted to engage the ends of the wrapper when the candy clamps are in the last-named position, said twisters comprising pivoted arms having rollers at their ends engaging the wrapper, and means for moving the rollers together and imparting rotary movement to the arms, substantially as described.

25. The combination with a support, two wheels on the support, and an endless conveyer on the wheels, of a series of candy clamps having rotary mounting on the conveyer, means for feeding a wrapper strip in U-shaped formation into the candy clamps while the latter are on the upper run of the conveyer, means for depositing pieces of candy into the wrapper in the clamps, means for folding the wrapper on the candy, means for cutting the wrapper, between the candy clamps, means for turning the candy clamps at right angles to the normal feed during the passage of the clamps around one wheel, and means for twisting the ends of the wrapper during the last-mentioned movement of the clamps, substantially as described.

26. The combination with a support, two wheels on the support, and an endless conveyer on the wheels, of a series of candy clamps having rotary mounting on the conveyer, means for feeding a wrapper strip in U-shaped formation into the candy clamps while the latter are on the upper run of the conveyer, means for depositing pieces of candy into the wrapper in the clamps, means for folding the wrapper on the candy, means for cutting the wrapper, between the candy clamps, means for turning the candy clamps at right angles to the normal feed during the passage of the clamps around one wheel, means for twisting the ends of the wrapper during the last-mentioned movement of the clamps, and means for releasing the wrapped candy from the candy clamps during the movement of the latter on the lower run of the conveyer, substantially as described.

27. In a machine of the character described, the combination with an endless conveyer, of a series of candy clamps having rotary mounting on the conveyer, means for directing a wrapper strip in U-shaped formation into the candy clamps, means for depositing pieces of candy into the wrapper in the clamps, means for folding the wrapper on the candy in the clamps, means for cutting the wrapper between the clamps, means for turning the clamps at right angles to the normal feed thereof, and twisters constructed to twist the ends of the paper at opposite sides of the clamps when the latter are in the last-named position, said candy clamps having fixed and pivoted jaws, springs normally holding the pivoted jaws against the wrapper, rollers on the pivoted jaws, and cams engaging the rollers and opening the candy clamps on the lower run of the conveyer, substantially as described.

28. In a machine of the character described, the combination with an endless conveyer, of a series of candy clamps having rotary mounting on the conveyer, means for directing a wrapper strip in U-shaped formation into the candy clamps, means for depositing pieces of candy into the wrapper in the clamps, means for folding the wrapper on the candy in the clamps, means for cutting the wrapper between the clamps, means for turning the clamps at right angles to the normal feed thereof, rotary twisters constructed to engage the ends of the paper when the candy clamps are in the last-named position, rollers on the twisters engaging the paper, said candy clamps having fixed and pivoted jaws, springs normally holding the pivoted jaws against the wrapper, rollers on the pivoted jaws, and cams engaging the rollers and opening the candy clamps on the lower run of the conveyer, substantially as described.

29. The combination with an endless conveyer, of candy clamps having rotary mounting on the conveyer, means for depositing wrappers and pieces of candy in the clamps during the normal feed of the conveyer, means for turning the candy clamps at right angles to the normal direction of feed, and twisters adapted to engage the ends of the wrapper when the candy clamps are in the last-named position, said candy clamps having fixed and pivoted jaws, springs normally holding the pivoted jaws against the wrapper, rollers on the pivoted jaws, and cams engaging the rollers and opening the candy clamps on the lower run of the conveyer, substantially as described.

30. The combination with an endless conveyer, of candy clamps having rotary mounting on the conveyer, means for depositing wrappers and pieces of candy in the clamps during the normal feed of the conveyer, means for turning the candy clamps at right angles to the normal direction of feed, twisters adapted to engage the ends of the wrapper when the candy clamps are in the last-named position, said twisters comprising pivoted arms having rollers at their ends engaging the wrapper, means for moving the rollers together and imparting rotary movement to the arms, said candy clamps having fixed and pivoted jaws, springs normally holding the pivoted jaws against the wrapper, rollers on the pivoted jaws, and cams engaging the rollers and opening the candy clamps on the lower run of the conveyer, substantially as described.

31. The combination with a support, two wheels on the support, and an endless conveyer on the wheels, of a series of candy clamps having rotary mounting on the conveyer, means for feeding a wrapper strip in U-shaped formation into the candy clamps while the latter are on the upper run of the conveyer, means for depositing pieces of candy into the wrapper in the clamps, means for folding the wrapper on the candy, means for cutting the wrapper, between the candy clamps, means for turning the candy clamps at right angles to the normal feed during the passage of the clamps around one wheel, means for twisting the ends of the wrapper during the last-mentioned movement of the clamps, said candy clamps having fixed and pivoted jaws, springs normally holding the pivoted jaws against the wrapper, rollers on the pivoted jaws, and cams engaging the rollers and opening the candy clamps on the lower run of the conveyer, substantially as described.

32. In a machine of the character described, the combination with an endless conveyer, of a series of candy clamps on the endless conveyer, means for feeding a wrapping strip in U-shaped formation into the candy clamps, means for depositing pieces of candy in the wrapper in the candy clamps, two folders adapted to force the opposite sides of the wrapper one upon the other, means for cutting the wrapper at opposite sides of the candy clamp, and means for twisting the ends of the cut wrapper, substantially as described.

33. In a machine of the character described, the combination with an endless conveyer, of a series of candy clamps on the endless conveyer, means for feeding a wrapping strip in U-shaped formation into the candy clamps, means for depositing pieces of candy in the wrapper in the candy clamps, means for folding the wrapper onto the candy, a cutter comprising a circular series of radial arms, blades on the arms, spring-pressed housings normally covering the blades, rotary means coöperating with the housings for holding the paper taut and pressing the housings backwardly to permit engagement of the blades with the paper to sever the latter, and means for twisting the cut ends of the wrapper, substantially as described.

34. In a machine of the character described, the combination with means for feeding a continuous wrapper strip with pieces of candy therein, means for folding the strip on the candy, means for cutting the folded strip at opposite sides of the candy, means for turning the cut strips at an angle to the longitudinal feed thereof, and means for closing the wrapper strip at opposite sides of the candy while in the last-named position, substantially as described.

35. In a machine of the character described, the combination with an endless series of candy clamps, of means for directing a continuous U-shaped wrapper strip into the candy clamps, a candy forming mechanism above the conveyer, a transferring device between the forming mechanism and the wrapper, and a kicker constructed to kick pieces of candy from the forming mechanism into the transferring mechanism, substantially as described.

36. In a machine of the character described, the combination with an endless series of candy clamps, of means for directing a continuous U-shaped wrapper strip into the candy clamps, a candy forming mechanism above the conveyer, a transferring device between the forming mechanism and the wrapper, means for feeding the candy step by step through the forming mechanism and severing the candy into pieces, and a kicker constructed to kick the pieces of candy into the transferring mechanism, substantially as described.

37. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a series of rolls in the forming mechanism between which the candy is moved, an oscillating pressure device between the rolls operating to contract the candy, rotary cutters having blades thereon adapted to sever the candy into pieces, and a kicker movable between the cutter blades and adapted to force the pieces of candy into the transferring device, substantially as described.

38. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a kicker constructed to kick pieces of candy from the forming mechanism into the transferring mechanism, said transferring device constructed to grip the pieces of candy until reaching the candy clamps, and then constructed to release the candy, substantially as described.

39. In a machine of the character described, the combination with an endless series of candy clamps, of means for directing a continuous U-shaped wrapper strip into the candy clamps, a candy forming mechanism above the conveyer, a transferring device between the forming mechanism and the wrapper, means for feeding the candy step by step through the forming mechanism and severing the candy into pieces, a kicker constructed to kick the pieces of candy into the transferring mechanism, said transferring device constructed to grip the pieces of candy until reaching the candy clamps, and then constructed to release the candy, substantially as described.

40. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a series of rolls in the forming mechanism between which the candy is moved, an oscillating pressure device between the rolls operating to contract the candy, rotary cutters having blades thereon adapted to sever the candy into pieces, and a kicker movable between the cutter blades and adapted to force the pieces of candy into the transferring device, said transferring device constructed to grip the pieces of candy until reaching the candy clamps, and then constructed to release the candy, substantially as described.

41. In a machine of the character de scribed, the combination with an endless series of candy clamps, of means for directing a continuous U-shaped wrapper strip into the candy clamps, a candy forming mechanism above the conveyer, a transferring device between the forming mechanism and the wrapper, a kicker constructed to kick pieces of candy from the forming mechanism into the transferring mechanism, means for folding the wrapper onto the candy, means for cutting the wrapper at opposite sides of the clamps, and means for twisting the cut ends of the wrapper, substantially as described.

42. In a machine of the character described, the combination with an endless series of candy clamps, of means for directing a continuous U-shaped wrapper strip into the candy clamps, a candy forming mechanism above the conveyer, a transferring device between the forming mechanism and the wrapper, means for feeding the candy step by step through the forming mechanism and severing the candy into pieces, a kicker constructed to kick the pieces of candy into the transferring mechanism, means for folding the wrapper onto the candy, means for cutting the wrapper at opposite sides of the clamps, and means for twisting the cut ends of the wrapper, substantially as described.

43. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a series of rolls in the forming mechanism between which the candy is moved, an oscillating pressure device between the rolls operating to contract the candy, rotary cutters having blades thereon adapted to sever the candy into pieces, a kicker movable between the cutter blades and adapted to force the pieces of candy into the transferring device, means for folding the wrapper onto the candy, means for cutting the wrapper at opposite sides of the clamps, and means for twisting the cut ends of the wrapper, substantially as described.

44. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a kicker constructed to kick pieces of candy from the forming mechanism into the transferring mechanism, springs holding the candy clamps in position to grip the wrapper and the candy, means compelling the opening of the candy clamps after the twisting operation, and means permitting the closing of the candy clamps at the point of the reception of the candy therein, substantially as described.

45. In a machine of the character described, the combination with an endless series of candy clamps, of means for directing a continuous U-shaped wrapper strip into the candy clamps, a candy forming mechanism above the conveyer, a transferring device between the forming mechanism and the wrapper, means for feeding the candy step by step through the forming mechanism and severing the candy into pieces, a kicker constructed to kick the pieces of candy into the transferring mechanism, springs holding the candy clamps in position to grip the wrapper and the candy, means compelling the opening of the candy clamps after the twisting operation, and means permitting the closing of the candy clamps at the point of the reception of the candy therein, substantially as described.

46. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a series of rolls in the forming mechanism between which the candy is moved, an oscillating pressure device between the rolls operating to contract the candy, rotary cutters having blades thereon adapted to sever the candy into pieces, a kicker movable between the cutter blades and adapted to force the pieces of candy into the transferring device, springs holding the candy clamps in position to grip the wrapper and the candy, means compelling the opening of the candy clamps after the twisting operation, and means permitting the closing of the candy clamps at the point of the reception of the candy therein, substantially as described.

47. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a kicker constructed to kick pieces of candy from the forming mechanism into the transferring mechanism, means for folding the wrapper onto the candy, means for cutting the wrapper at opposite sides of the clamps, means for twisting the cut ends of the wrapper, springs holding the candy clamps in position to grip the wrapper and the candy, means compelling the opening of the candy clamps after the twisting operation, and means permitting the closing of the candy clamps at the point of the reception of the candy therein, substantially as described.

48. In a machine of the character described, the combination with an endless series of candy clamps, of means for directing a continuous U-shaped wrapper strip into the candy clamps, a candy forming mechanism above the conveyer, a transferring device between the forming mechanism and the wrapper, means for feeding the candy step by step through the forming mechanism and severing the candy into pieces, a kicker constructed to kick the pieces of candy into the transferring mechanism, means for folding the wrapper onto the candy, means for cutting the wrapper at opposite sides of the clamps, means for twisting the cut ends of the wrapper, springs holding the candy clamps in position to grip the wrapper and the candy, means compelling the opening of the candy clamps after the twisting operation, and means permitting the closing of the candy clamps at the point of the reception of the candy therein, substantially as described.

49. In a machine of the character described, the combination with an endless series of candy clamps, of means for directing a continuous U-shaped wrapper strip into the candy clamps, a candy forming mechanism above the conveyer, a transferring device between the forming mechanism and the wrapper, a series of rolls in the forming mechanism between which the candy is moved, an oscillating pressure device between the rolls operating to contract the candy, rotary cutters having blades thereon adapted to sever the candy into pieces, a kicker movable between the cutter blades and adapted to force the pieces of candy into the transferring device, means for folding the wrapper onto the candy, means for cutting the wrapper at opposite sides of the clamps, means for twisting the cut ends of the wrapper, springs holding the candy clamps in position to grip the wrapper and the candy, means compelling the opening of the candy clamps after the twisting operation, and means permitting the closing of the candy clamps at the point of the reception of the candy therein, substantially as described.

50. In a machine of the character described, the combination with means for feeding a wrapper strip in U-shaped formation, means for depositing pieces of candy in the wrapper, means for folding the wrapper on the candy, means for severing the wrapper between the pieces of candy, means for turning the cut wrapper strip at an angle to the normal feed thereof, and means for twisting the wrapper at opposite sides of the pieces of candy, substantially as described.

51. In a machine of the character described, the combination with means for feeding a wrapper strip in U-shaped formation, means for depositing pieces of candy in the wrapper, means for folding the wrapper on the candy, means for severing the wrapper between the pieces of candy, means for twisting the wrapper at opposite sides of the pieces of candy, and means for clamping the wrapper and the candy during the folding, cutting, and twisting operation, substantially as described.

52. In a machine of the character described, the combination with means for feeding a wrapper strip in U-shaped formation, means for depositing pieces of candy in the wrapper, means for folding the wrapper on the candy, means for severing the wrapper between the pieces of candy, means for twisting the wrapper at opposite sides of the pieces of candy, means for clamping the wrapper and the candy during the folding, cutting, and twisting operation, and means permitting the release of the candy after the twisting operation, substantially as described.

In testimony whereof I have signed my name to this specification in the presence of two subscribing witnesses.

ESECK C. MILLER.

Witnesses:
MARIE JACKSON,
CHAS. E. POTTS.